United States Patent
Van Boxtel et al.

(10) Patent No.: US 9,649,918 B2
(45) Date of Patent: May 16, 2017

(54) SUNSHADE ASSEMBLY

(71) Applicant: Inalfa Roof Systems Group B.V., Venray (NL)

(72) Inventors: Eduardus Christianus Henricus Van Boxtel, Zeeland (NL); Ruud Geurts, Helden (NL); Robert Rikkert, Nuenen (NL); Paulus Johannes Wilhelmus Munsters, Uden (NL); Joonggl Shin, Suwon (KR); Dave Keller, Ortonville, MI (US)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 0 days.

(21) Appl. No.: 14/826,763

(22) Filed: Aug. 14, 2015

(65) Prior Publication Data
US 2016/0221424 A1   Aug. 4, 2016

(30) Foreign Application Priority Data
Aug. 18, 2014  (EP) ..................................... 14181245

(51) Int. Cl.
*B60J 7/06* (2006.01)
*B60J 7/00* (2006.01)
*B60J 7/10* (2006.01)

(52) U.S. Cl.
CPC ............. *B60J 7/067* (2013.01); *B60J 7/0015* (2013.01); *B60J 7/10* (2013.01)

(58) Field of Classification Search
CPC ............. B60J 7/067; B60J 7/10; B60J 7/0015
(Continued)

(56) References Cited

U.S. PATENT DOCUMENTS 4,610,293 A   9/1986 Weiblen
4,649,981 A   3/1987 Bibeau
(Continued)

FOREIGN PATENT DOCUMENTS

DE   102005040758   3/2007
EP      2151339      2/2010
(Continued)

OTHER PUBLICATIONS

Communication dated Oct. 7, 2014 for corresponding foreign application 14181245.3 filed Aug. 18, 2014.

*Primary Examiner* — D Glenn Dayoan
*Assistant Examiner* — Dana D Ivey
(74) *Attorney, Agent, or Firm* — Steven M. Koehler; Westman, Champlin & Koehler, P.A.

(57) ABSTRACT

A sunshade assembly comprises a flexible sunscreen having opposed longitudinal edges and opposed transversal edges, a rotatable winding shaft and an operating beam and two opposed longitudinal guides each defining a guide channel for receiving therein and guiding inwardly through an entrance opening folded parts of corresponding ones of said longitudinal edges of the sunscreen. The operating beam at opposite ends includes positioning members around which inwardly folded wings of the longitudinal edges of the sunscreen are positioned. The positioning members extend into corresponding ones of said longitudinal guides longitudinally in a direction towards the winding shaft such that the positioning members only at a leading end thereof facing away from the winding shaft are connected to the operating beam and are movable with the operating beam. Each positioning member is positioned entirely within the respective guide channel without extending through the entrance opening.

20 Claims, 14 Drawing Sheets

(58) Field of Classification Search
USPC .......................................................... 296/219
See application file for complete search history.

(56) References Cited

U.S. PATENT DOCUMENTS

| | | | |
|---|---|---|---|
| 5,526,865 A | 6/1996 | Coenraets | |
| 6,119,758 A | 9/2000 | Coenraets | |
| 6,957,850 B2 | 10/2005 | Breuer | |
| 6,968,887 B2 | 11/2005 | Hansen | |
| 6,991,761 B2 | 1/2006 | Hehenberger | |
| 7,389,807 B2 | 6/2008 | Nagare | |
| 7,744,151 B2 * | 6/2010 | Jansen | B60J 7/0015 160/272 |
| 7,793,702 B2 | 9/2010 | Biewer | |
| 7,798,568 B2 * | 9/2010 | Keller | B60J 7/0015 160/273.1 |
| 8,602,081 B2 | 12/2013 | Komatsu | |
| 8,607,841 B2 | 12/2013 | Hayashiguchi | |
| 2005/0045287 A1 | 3/2005 | Hansen | |
| 2007/0205636 A1 | 9/2007 | Gonzalez Merino | |
| 2008/0179021 A1 | 7/2008 | Biewer | |
| 2008/0216971 A1 | 9/2008 | Rockelmann | |
| 2009/0014555 A1 | 1/2009 | Litvinov | |
| 2009/0145559 A1 | 6/2009 | Glasl | |
| 2010/0032991 A1 | 2/2010 | Keller | |
| 2010/0170645 A1 | 7/2010 | Lin | |
| 2011/0056632 A1 * | 3/2011 | Thalhammer | B60J 1/2038 160/314 |
| 2011/0227371 A1 | 9/2011 | Nellen | |

FOREIGN PATENT DOCUMENTS

| | | |
|---|---|---|
| JP | H11141250 | 5/1999 |
| WO | 2006053520 | 5/2006 |

* cited by examiner

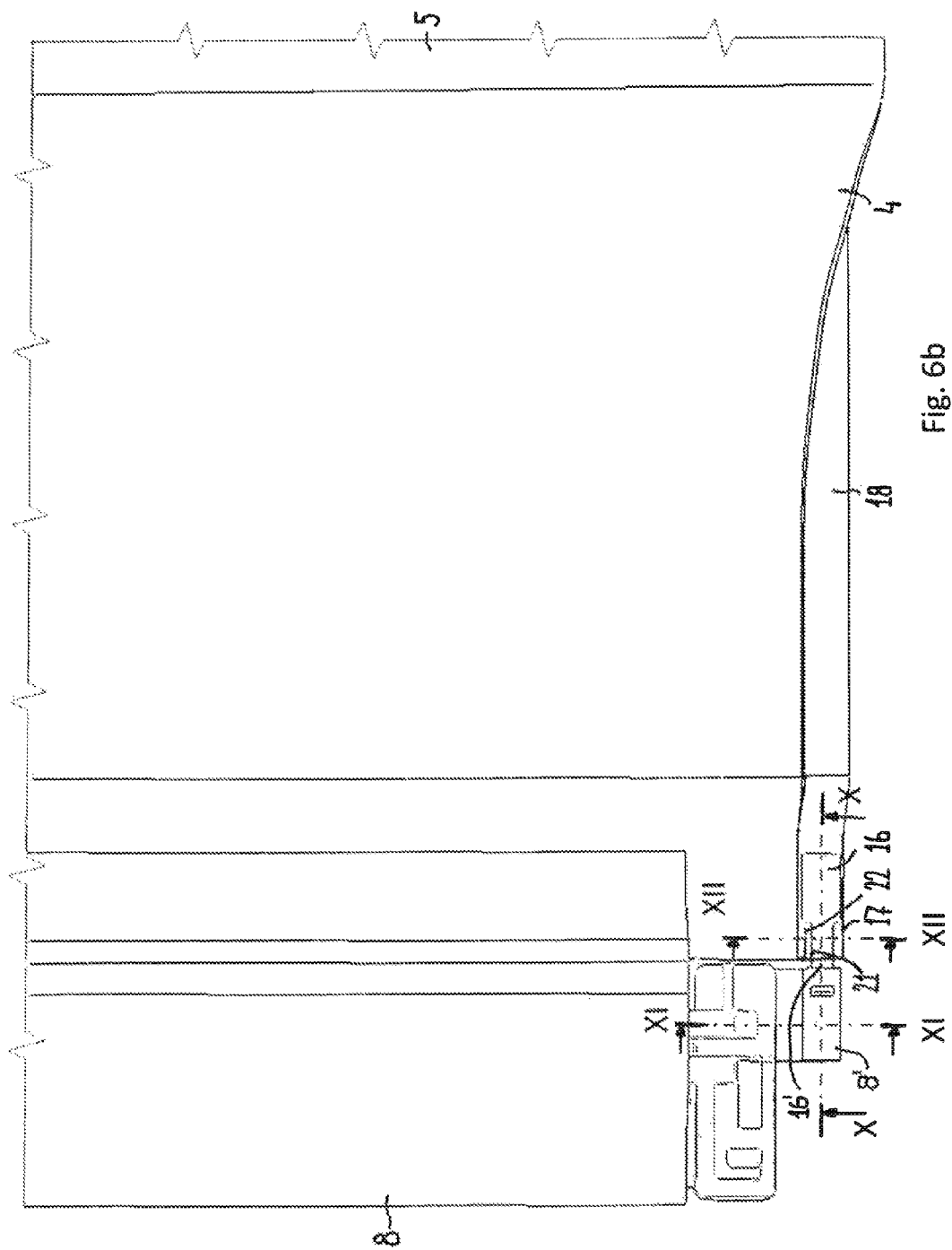

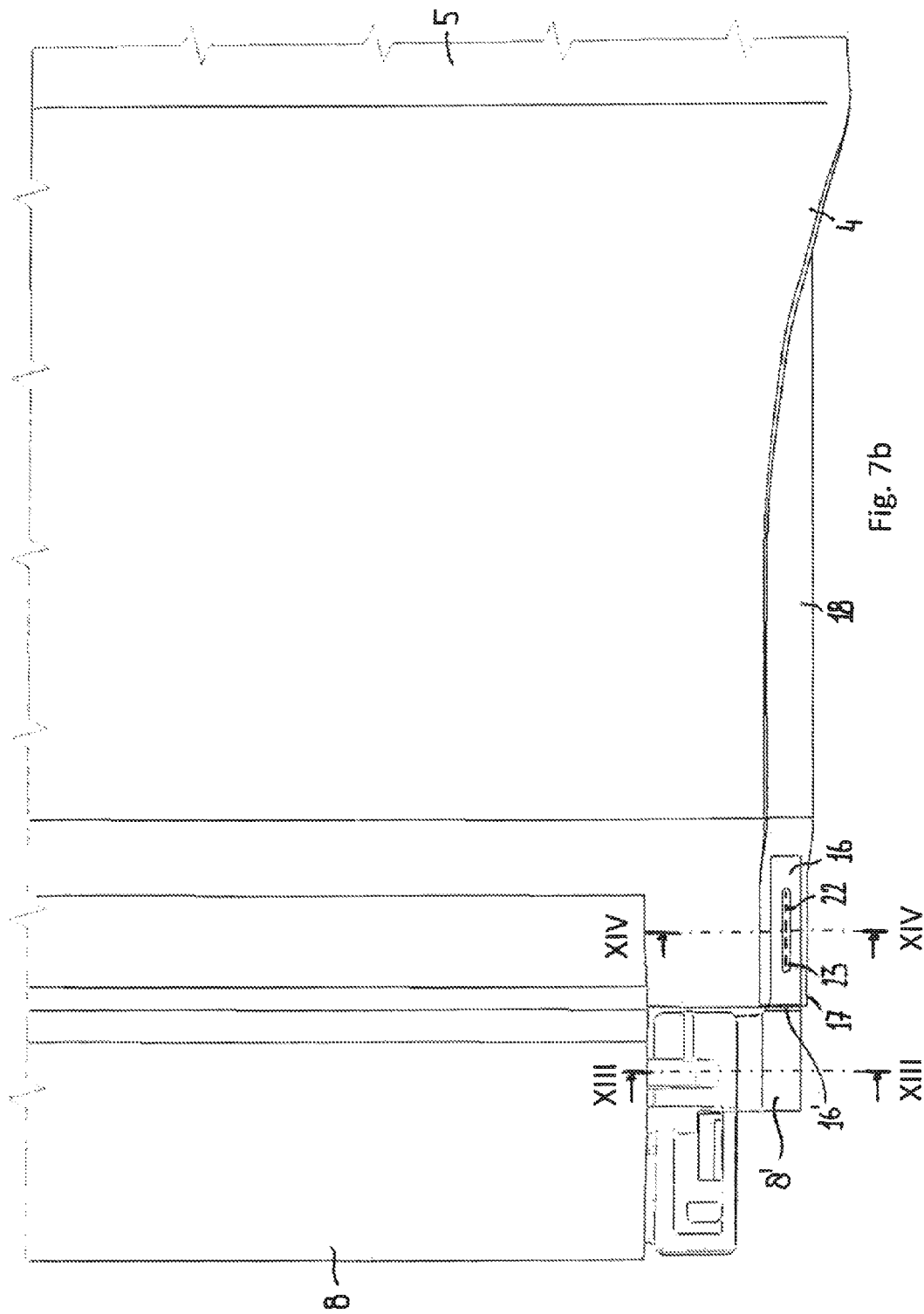

SUNSHADE ASSEMBLY

BACKGROUND

The discussion below is merely provided for general background information and is not intended to be used as an aid in determining the scope of the claimed subject matter.

Aspects of the invention relate to a sunshade assembly comprising a flexible sunscreen having opposed longitudinal edges and opposed transversal edges, a rotatable winding shaft configured for winding and unwinding the sunscreen at a first transversal edge and an operating beam connected to the second, leading one of said transversal edges, and two opposed longitudinal guides each defining a guide channel for receiving therein and guiding inwardly folded parts of corresponding ones of said longitudinal edges of the sunscreen, wherein the guides further each define an inwardly directed, longitudinally extending entrance opening for the respective guide channel and wherein the operating beam at opposite ends is provided with positioning members around which inwardly folded wings of the longitudinal edges of the sunscreen are positioned which define leading parts of the respective inwardly folded parts of the sunscreen, which positioning members extend from the operating beam into corresponding ones of said longitudinal guides and are movable with the operating beam for again positioning the longitudinal edges of the sunscreen into the longitudinal guides after coming out of said guides.

Although the provision of the positioning members (also sometimes referred to as "pilots") allows to reposition the longitudinal edges of the sunscreen into the longitudinal guides of the sunshade assembly after coming out of said guides, one of the primary goals to be achieved when designing such a sunshade assembly is that the longitudinal edges of the sunscreen remain in the longitudinal guides as much as possible under normal operational conditions notwithstanding forces acting on the sunscreen. One manner for achieving this goal is to make the entrance opening as small as possible. The smaller such an entrance opening, the larger generally the force required for making the longitudinal edges of the sunscreen to come out of the guides. However, the combined thickness of a positioning member with wing folded around it (in fact the combined thickness of the positioning member and sunscreen) which has to pass through the entrance opening does not allow to make the entrance opening as small as desired.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An embodiment of a sunshade assembly described herein has each positioning member extending from the operating beam longitudinally in a direction towards the winding shaft such that the positioning member only at a leading end thereof facing away from the winding shaft is connected to the operating beam and is positioned entirely within the respective guide channel without extending through the entrance opening.

Whereas in the state of the art sunshade assembly the positioning member and the sunscreen extend through the entrance opening at the same location (a location where the positioning member is attached to and extends transversally away from the operating beam), in accordance with an aspect of the present invention the specific shape and longitudinal extension of the positioning member (resulting from the fact that the positioning member only at a leading end thereof facing away from the winding shaft, thus an end facing in a longitudinal direction, is connected to the operating beam) results in a situation in which nowhere both the positioning member and sunscreen extend through the entrance opening (longitudinally ahead of the positioning member only an outer end of the operating beam will extend through the entrance opening and to this outer end the positioning member is connected which does not extend through the entrance opening at all). Thus the entrance opening may be constructed with a smaller dimension, resulting in a better retention of the longitudinal edges of the sunscreen in the guides. When the entrance opening for example is defined between two spaced guide legs (of the longitudinal guide) of which corresponding ends define the entrance opening, such ends may be located closer to each other without impeding the movement of the positioning member and sunscreen along the guide. It is noted that the design does not affect the effectiveness of the positioning members to reposition a longitudinal edge of the sunscreen into a respective longitudinal guide after coming out of said guide.

In one embodiment of the sunshade assembly, the positioning member is provided with a recess and the inwardly folded wing of the sunscreen is connected to the remainder of the sunscreen at said recess.

Although many ways exist to directly attach the wing to the positioning member (for example by using an adhesive or by welding techniques), such a recess in combination with a connection between the inwardly folded wing of the sunscreen and the remainder of the sunscreen provides an effective manner of obtaining a reliable connection between the sunscreen and the positioning member.

It is conceivable, then, that the recess is defined by a transversal constriction of the positioning member. Such a transversal constriction and connection at said location in combination with an adjacent wider part of the positioning member effectively prevents a relative longitudinal shift between the sunscreen and positioning member.

In an alternative embodiment the recess is defined by a through hole in the positioning member.

The inwardly folded wing of the sunscreen may be connected to the remainder of the sunscreen by means of a mechanical connection, such as a stitch, staple or rivet, or by means of welding or by means of an adhesive, or any combination thereof. As long as both parts are surely interconnected and said interconnection extends through the recess, the required result will be achieved.

Of course it also is possible to directly attach the sunscreen (or the folded wing) to the positioning manner in any conventional manner, as discussed above.

For constructional reasons or for ease of mounting/dismounting it may be advantageous when the positioning member is removably attached to the operating beam.

In one embodiment the positioning member is removably attached to the operating beam by means of a snap connection. Other removable or disconnectable connections may be used to.

When the positioning member defines a cross sectional shape in correspondence with the intended shape defined by the assembly of inwardly folded part of the sunscreen and remainder of the sunscreen at a position of cooperation of said assembly with the respective longitudinal guide, the positioning members not only may be used for again positioning the longitudinal edges of the sunscreen into the longitudinal guides after coming out of said guides, but also may offer the inwardly folded parts of the sunscreen an optimal shape (and/or position) for obtaining the best retention force of the sunscreen in said guides at said positions of cooperation with the guides.

In a specific embodiment said cross sectional shape is such that the positioning member is wedge shaped with a lower surface extending substantially horizontally and an upper surface extending inclined upwardly as considered in an inward direction towards the entrance opening.

BRIEF DESCRIPTION OF THE DRAWINGS

Hereinafter aspects of the invention will be elucidated while referring to the drawing, in which:

FIGS. 6a,6b and 7a,7b and 8,9 show alternative embodiments in a schematic perspective and top plan view, respectively;

DETAILED DESCRIPTION OF THE ILLUSTRATIVE EMBODIMENTS

Figure 1:
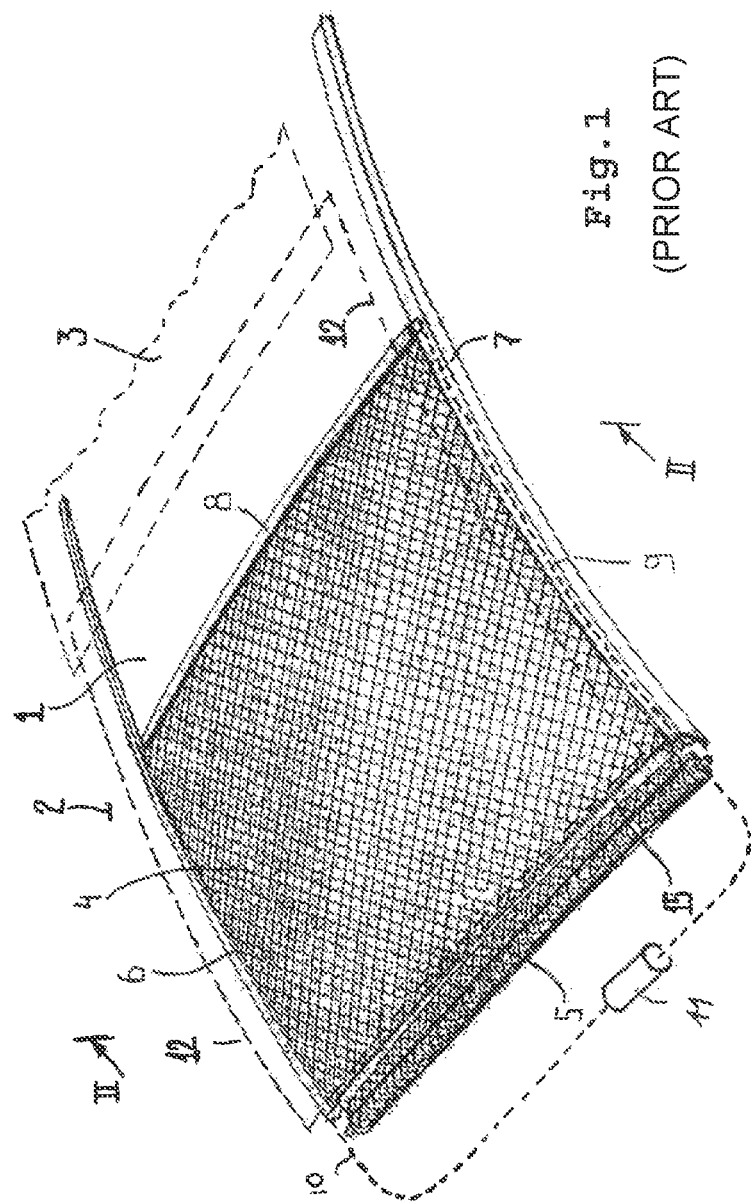
FIG. 1 shows, schematically and in a perspective view, a state of the art sunshade assembly applied to an open roof construction.
Figure 2:
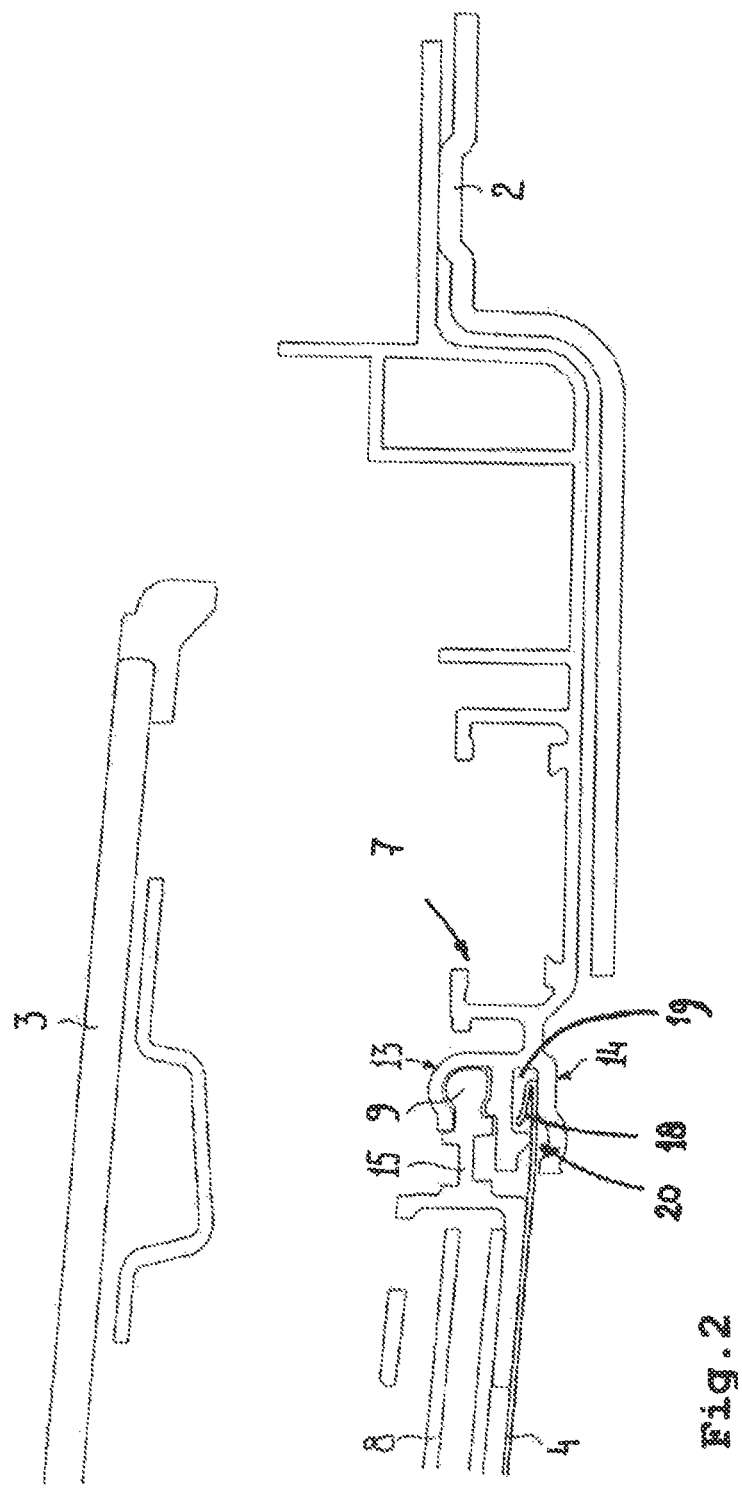
FIG. 2 shows, schematically and in a transverse cross section according to II-II in FIG. 1, a detail of the state of the art sunshade assembly.
Figure 3:
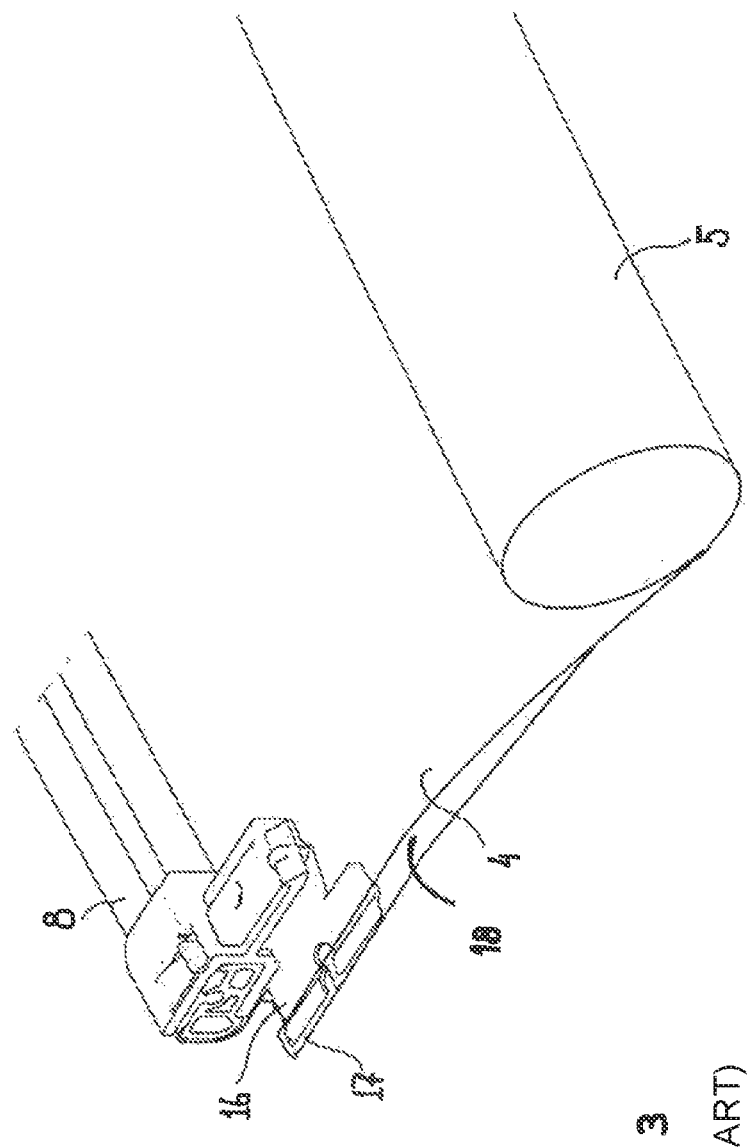
FIG. 3 shows, schematically and in a perspective view, a part of the state of the art sunshade assembly of FIGS. 1 and 2 for illustrating its operation.

Firstly referring to FIGS. 1-3, an example is illustrated of a state of the art open roof construction for a vehicle having a roof assembly and comprising a sunshade assembly. Said roof assembly is for opening and closing a roof opening 1 in a stationary roof part 2 of the vehicle and includes a movable closure panel 3 which, by means not illustrated in detail but known per se, can be moved for opening and closing said roof opening 1. Commonly, as is known, the movable panel 3 is guided in longitudinal guides mounted in or formed in the stationary roof part 2 along longitudinal sides 12 of the roof opening 1. A user operated device such as a motor or crank (not illustrated) is operably coupled to the panel 3 via cables or the like to move the panel 3 selectively between its open and closed positions. In FIG. 1 the closure panel 3 has been illustrated in a position in which it opens the roof opening 1.

Below the roof opening 1 a sunshade assembly is positioned. Basically, said sunshade assembly comprises a flexible sunscreen 4, a rotatable winding shaft 5 for winding and unwinding the sunscreen 4 at a first transversal edge and two opposite longitudinal guide assemblies 6 and 7. The guide assemblies 6, 7 can be connected to or formed integral from a single unitary body with the guides of the closure panel (not illustrated). Likewise, the guide assemblies 6, 7 can be separate from the guides of the panel 3. Drive members may be provided, which in FIG. 1 have been illustrated schematically by dotted lines 9, 10. As is known per se, the drive members may comprise longitudinal members driven by an actuator 11 for a reciprocating movement for winding and unwinding the sunscreen 4.

Each drive member 9, 10 is connected to an operating beam 8 provided at and connected to a second, leading one of the transversal edges of the sunscreen 4 remote from the winding shaft 5. Although the reciprocating movement of the sunscreen 4 primarily is generated by the reciprocating movement of the drive members 9 and 10 as caused by the actuator 11, it is possible too that in addition the winding shaft 5 is preloaded in a sense for winding the sunscreen 4 thereon. Further it should be noted that the movement of the sunscreen 4 also may be initiated manually.

Now, reference is made to FIG. 2 which schematically illustrates a transverse cross section according to II-II in FIG. 1 (it is noted that only the right half of the cross section is shown, the left half being a mirror image thereof). FIG. 2 shows the panel 3, right guide assembly 7 (attached to the stationary roof part 2) and operating beam 8.

The guide assembly 7, in the illustrated state of the art embodiment, comprises an upper longitudinal guide 13 and a lower longitudinal guide 14. The operating beam 8 has attached to its outer end a mounting part 15 which protrudes into the upper longitudinal guide 13 and which is connected therein to drive member (e.g. cable) 9. Thus, the operating beam 8 comprises opposite lateral ends each extending into a corresponding upper longitudinal guide 13 and being guided therein. The corresponding longitudinal edge of the sunscreen 4 (which is provided with an inwardly folded part 18) will be guided in a guide channel 19 of the lower longitudinal guide 14. Said longitudinal guide 14 further comprises an inwardly directed, longitudinally extending entrance opening 20 for the guide channel 19.

It is noted that it also is possible that the operating beam 8 is guided in the lower longitudinal guide 14, whereas the sunscreen 4 is guided in the upper longitudinal guide 13. This will apply too for the present invention.

Referring to FIG. 3, positioning members 16 (only one of which is illustrated in FIG. 3) are attached to and extend transversally away from opposite outer ends of the operating beam 8 and extend into, and are guided by, the respective lower longitudinal guides 14. A wing 17 of the sunscreen 4 which defines a leading part of the respective inwardly folded part 18 is folded around each such positioning member 16.

In FIG. 3 part of the operating beam 8 near its left end is shown. The guide assembly 7 with upper longitudinal guide 13 and lower longitudinal guide 14 have been omitted in this view to more clearly show the positioning member 16. From FIG. 3 it appears that the wing 17 of the sunscreen 4 gradually unfolds in a direction towards and near to the winding shaft 5. When, in a fully or partially closed position of the sunscreen 4, a longitudinal edge with part 18 thereof comes out of the lower guide 14, the position thereof can be restored by fully opening the sunscreen 4 (winding it onto the winding shaft 5) and again moving it to a (partially) closed position (winding it off from the winding shaft 5). The wing 17 extending around the positioning member 16 will take care of again properly positioning the longitudinal edge of the sunscreen 4 with its inwardly folded part 18 into the corresponding lower longitudinal guide 14.

At the location of the positioning member 16 the sunscreen 4 together with said positioning member 16 will extend together (as a stacked assembly) through the entrance opening 20, thus together defining the smallest possible width of such entrance opening 20 (such that the positioning member 16 with sunscreen 4 are still able to freely move longitudinally along the entrance opening 20). Such width, however, will be larger than necessary at locations where only the sunscreen 4 extends through the entrance opening (thus roughly at places between the positioning member 16 and the winding shaft 5), resulting in an increased risk for the longitudinal sunscreen edges (with inwardly folded parts 18) of coming out of the longitudinal guides 14.

Figure 4:
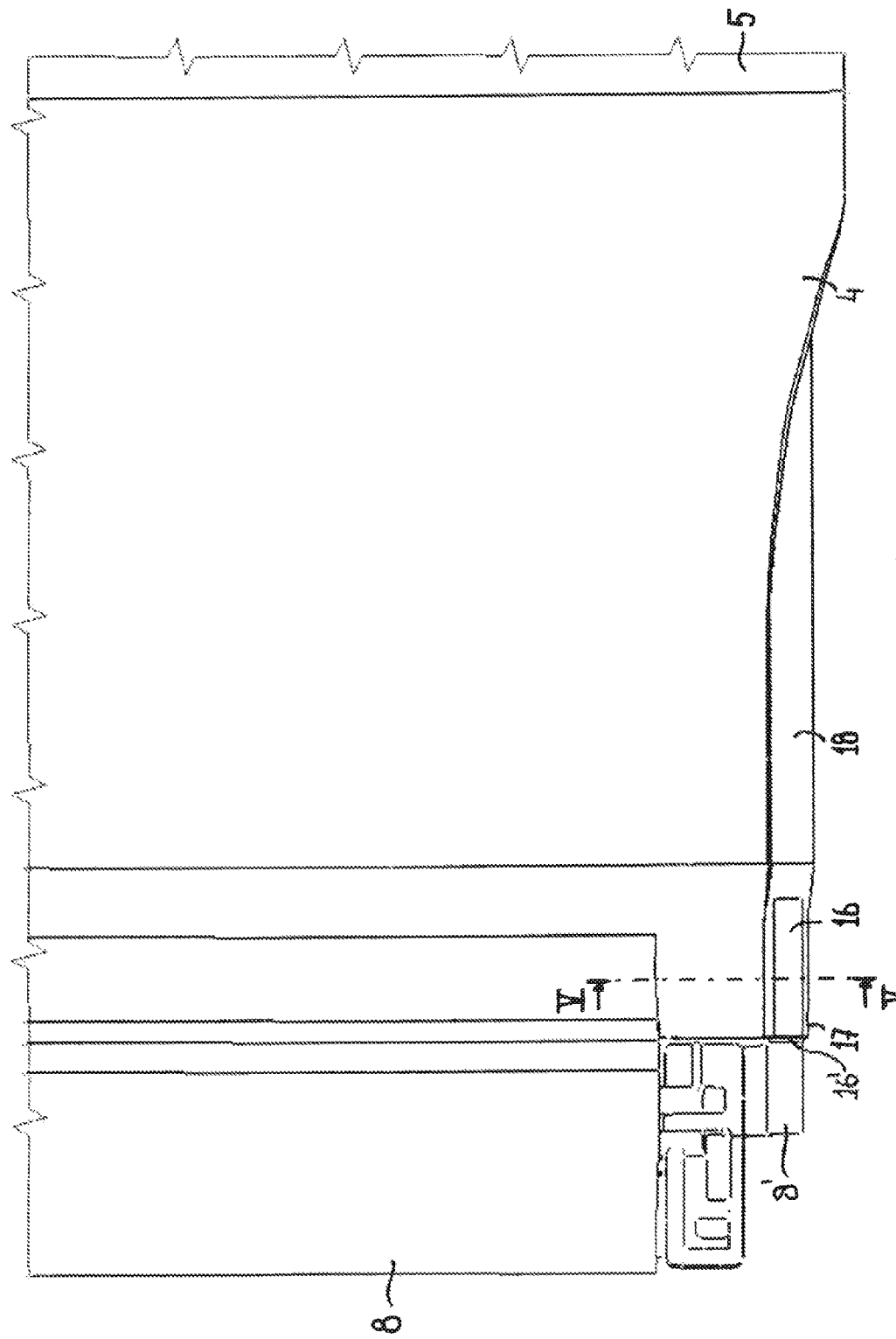
FIG. 4 shows a schematic top plan view of part of a sunshade assembly.
Figure 5:
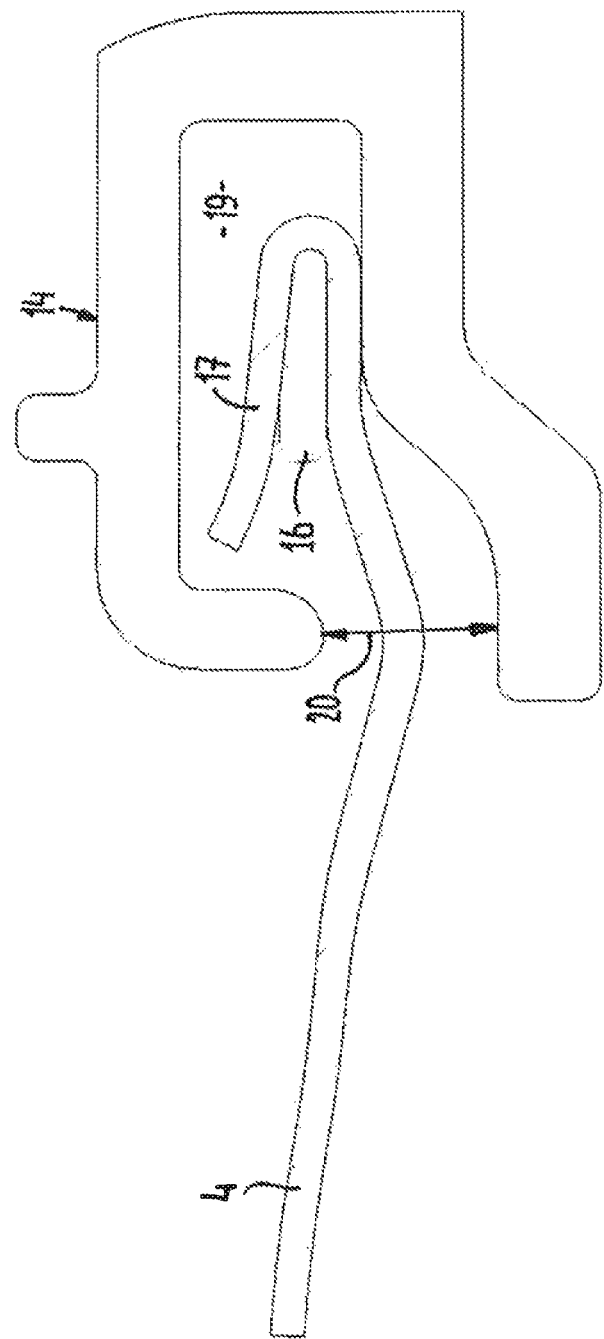
FIG. 5 shows a cross section according to V-V in FIG. 4.

Now, reference is made to FIGS. 4 and 5 illustrating a first embodiment of the sunshade assembly. As can be seen clearly in the schematic top plan view of FIG. 4 (in which the respective lower longitudinal guide 14—or another equivalent guide—has been omitted), each positioning member 16 (only one of which is shown) extends from the operating beam 8 (specifically an outer end 8' thereof) longitudinally in a direction towards the winding shaft 5 such that the positioning member only at a leading end 16' thereof facing away from the winding shaft 5 is connected to the operating beam 8. As follows from FIG. 5 (illustrating a cross section according to V-V in FIG. 4 with added longitudinal guide 14) the positioning member 16 is positioned entirely within the respective guide channel 19 of the longitudinal guide 14 without extending through the entrance opening 20. Only the outer end 8' of the operating beam 8 longitudinally ahead of the positioning member 16 extends through said entrance opening. As a result the dimension (width) of the entrance opening 20 (as indicated by a twin arrow in FIG. 5) can be smaller compared to the state of the art situation described with respect to FIGS. 1-3. As a result the longitudinal edges (with inwardly folded parts 18) of the sunscreen 4 are better retained in the respective longitudinal guides 14.

Figure 6A:
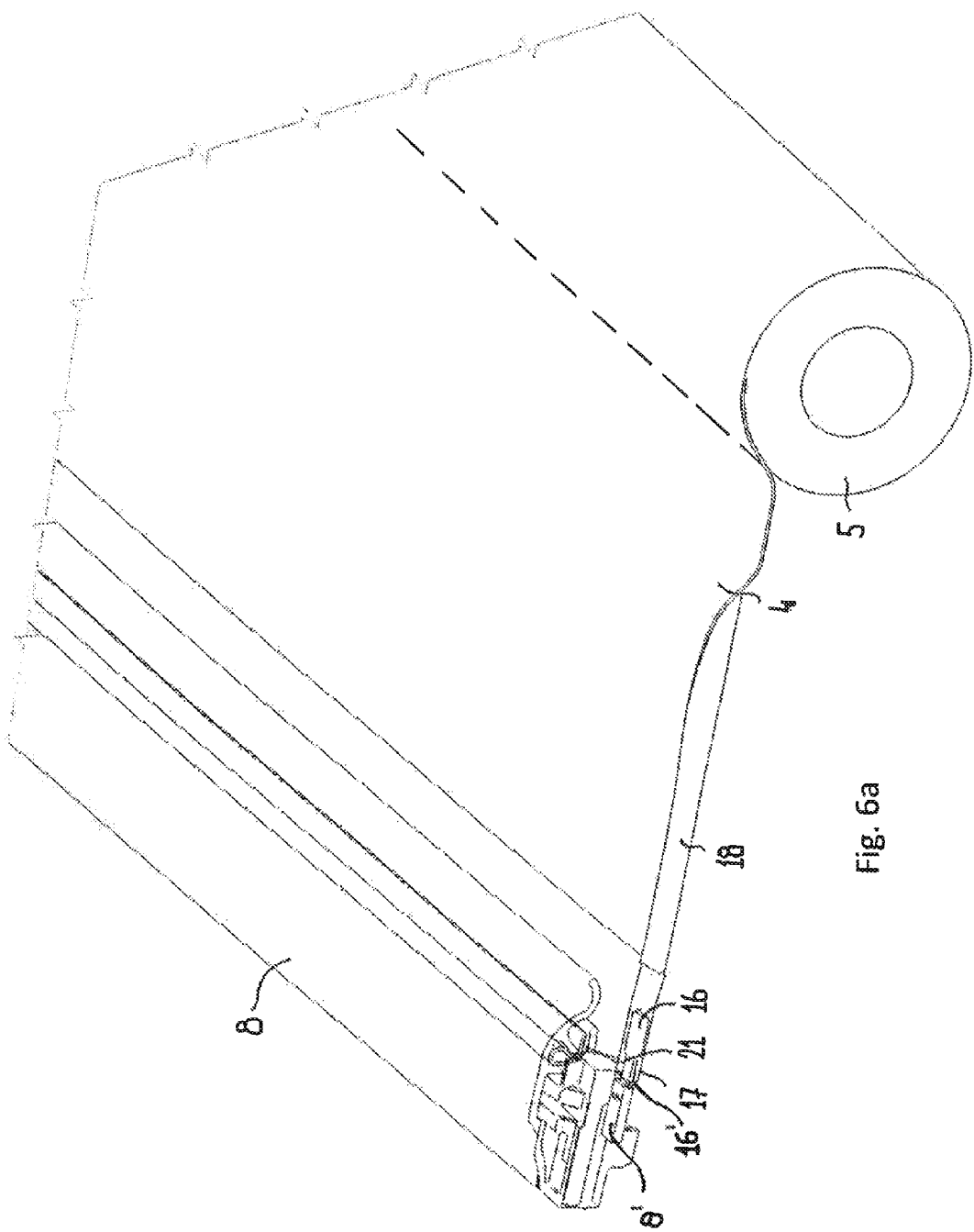

FIGS. 6a,b and 7a,b show in a schematic perspective and top plan view, respectively, two other embodiments of a positioning member 16 which are provided with a recess and wherein the inwardly folded wing 17 of the sunscreen 4 is connected to the remainder of the sunscreen at said recess.

Specifically, in FIGS. 6a and 6b the recess is defined by a transversal constriction 21 of the positioning member 16. At said constriction 21 at least one stitch seam 22 (best visible in FIG. 6b) is provided connecting the inwardly folded wing 17 to the remainder of the sunscreen 4. The cooperation between the stitch seam 22 and constriction or recess 21 prevents a relative longitudinal shift between the positioning member 16 and the sunscreen 4.

Figure 7A:
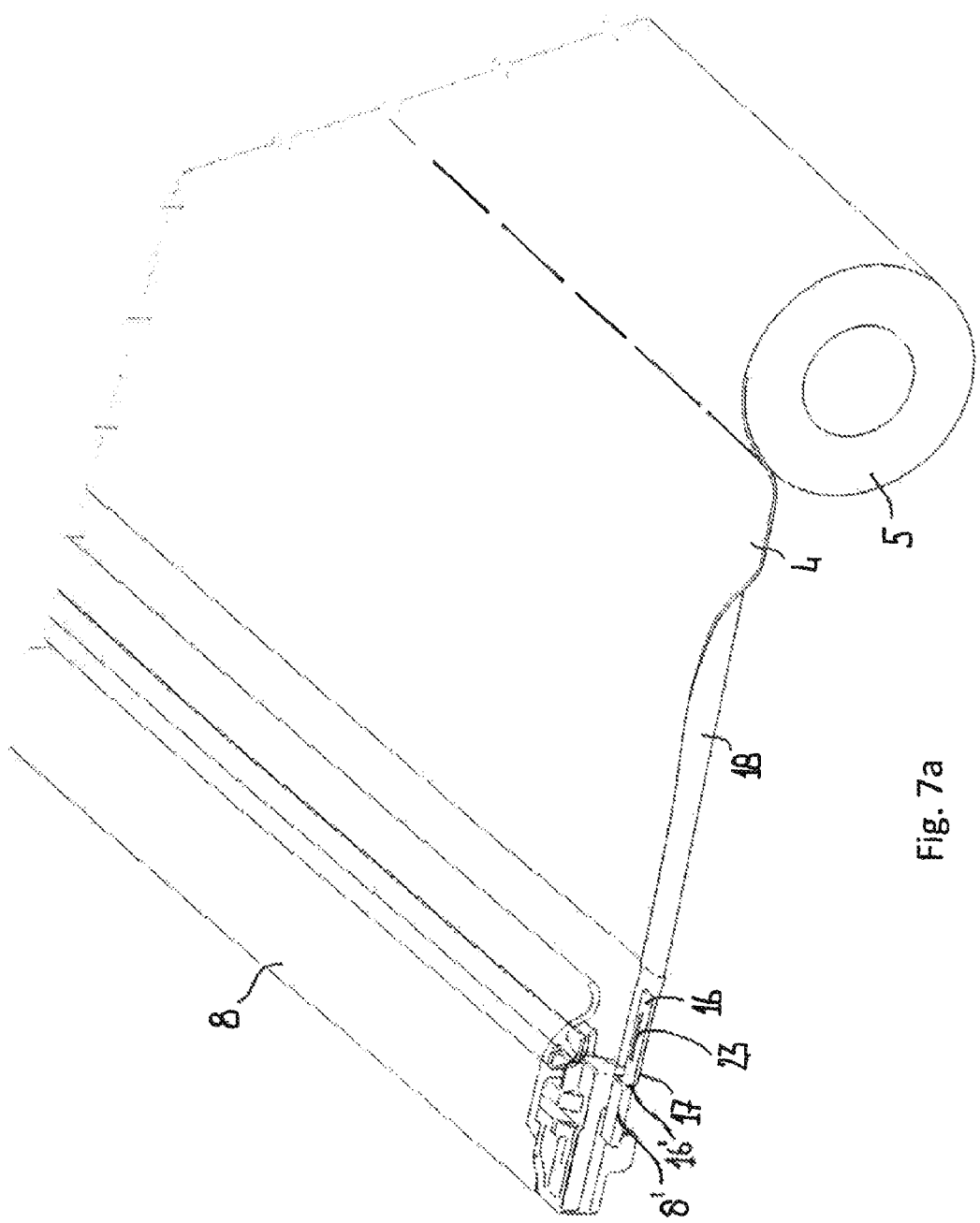

In FIGS. 7a and 7b the recess is defined by a through hole 23 in the positioning member 16; in this embodiment again a stitch seam 22 (best visible in FIG. 7b) is provided at the through hole 23.

Although in the embodiments of FIGS. 6a,b and 7a,b the inwardly folded wing 17 of the sunscreen 4 is connected to the remainder of the sunscreen by means of stitch seam 22, also other mechanical connections are conceivable, such as for example a staple or rivet, or methods like welding or by means of an adhesive, or any combination thereof.

Figure 10:
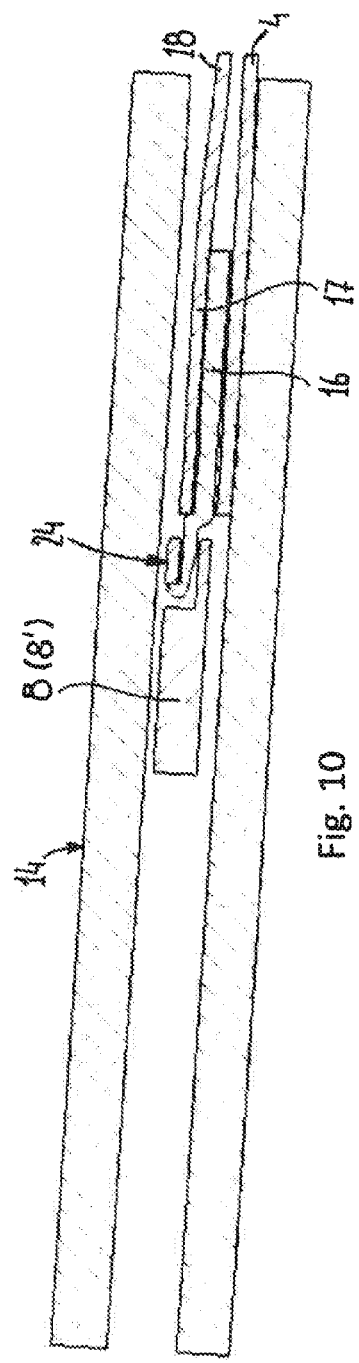
FIGS. 10-12 show cross sections according to X-X, XI-XI and XII-XII, respectively, in FIG. 6b.
Figure 12:
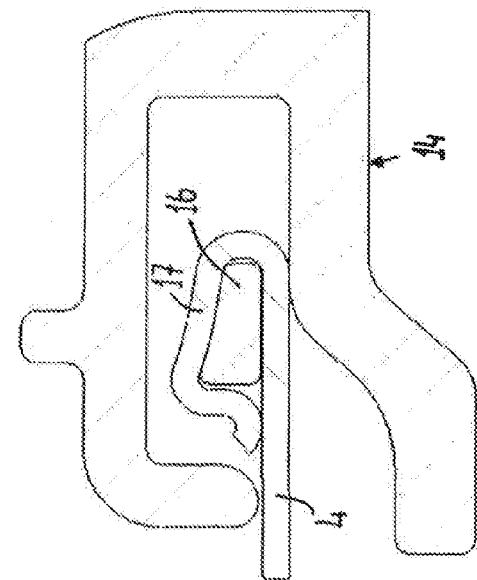

The positioning member 16 may be removably attached to the operating beam 8 (as for example indicated schematically at 24 in FIG. 10), for example using a snap connection.

Figure 11:
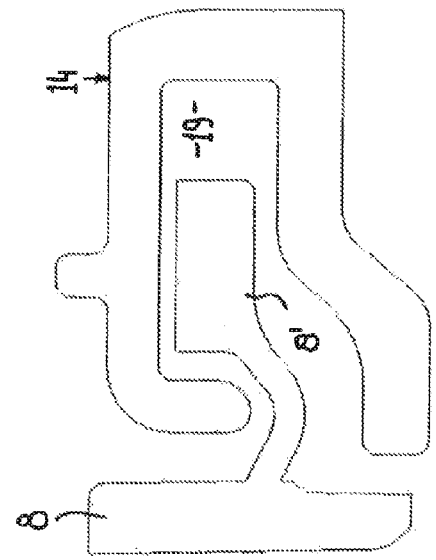
Figure 14:
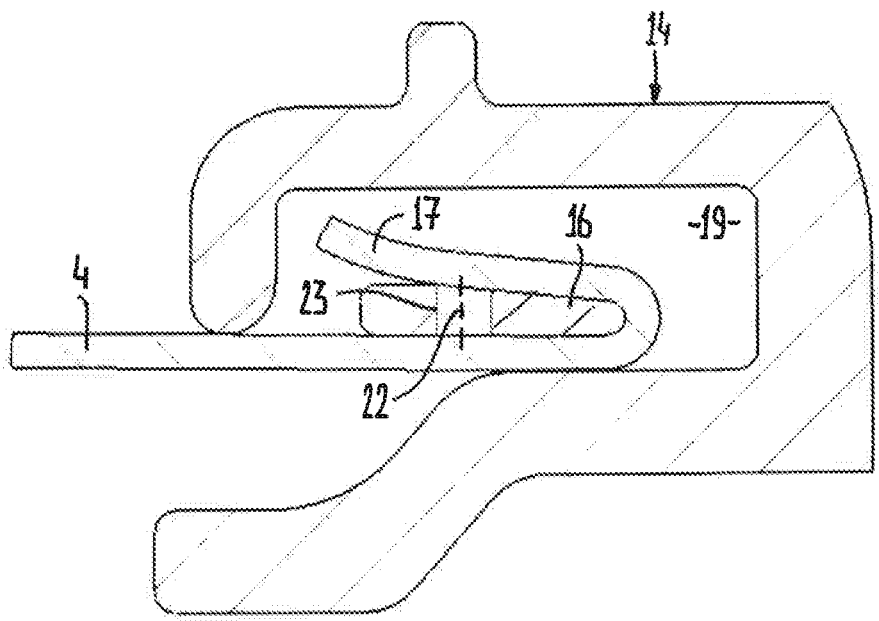
FIGS. 13 and 14 show cross sections according to XIII-XIII and XIV-XIV, respectively, in FIG. 7b, and FIGS. 15 and 16 show cross sections according to XV-XV and XVI-XVI, respectively, in FIG. 9.
Figure 13:
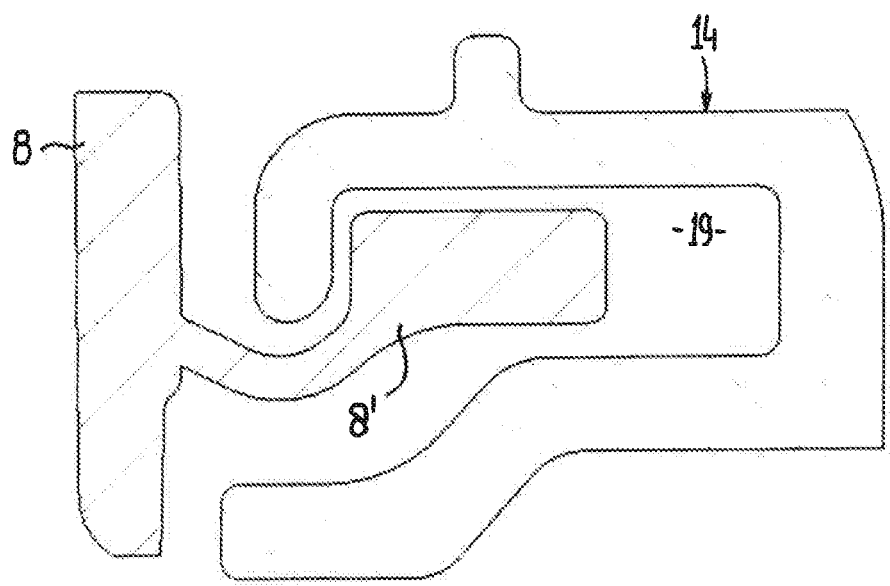
Figure 15:
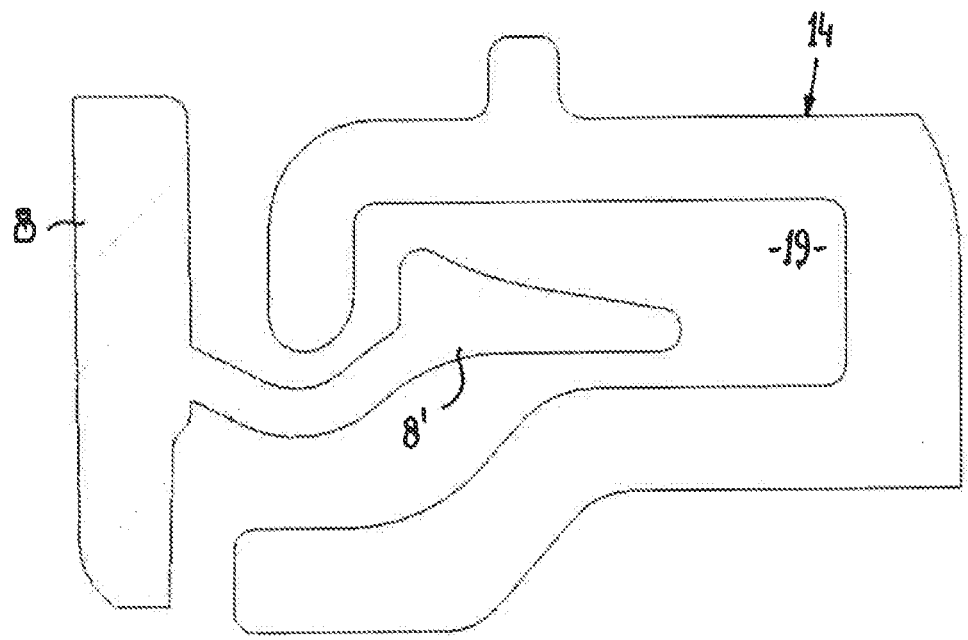

Details of the embodiments according to FIGS. 6a,b and 7a,b appear more clearly from the cross sectional views according to FIGS. 10-14. The cross sectional views according to FIGS. 11, 13 and 15 are taken along the operating beam 8 with an outer end 8' thereof (thus at a position where the sunscreen 4 with inwardly folded wing 17 is not present) from which a positioning member 16 (not visible in these figures) extends longitudinally towards the winding shaft 5.

Figure 8:
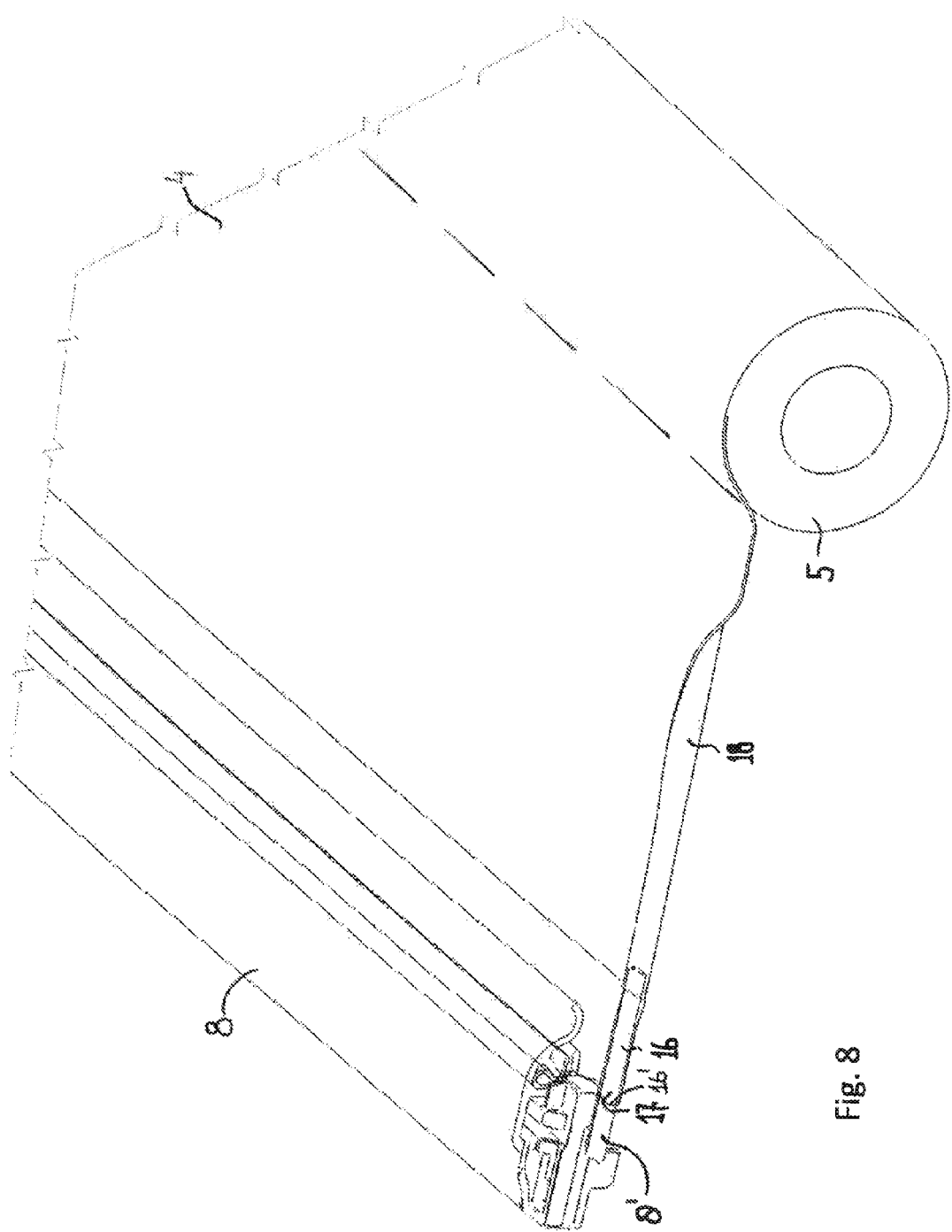
Figure 9:
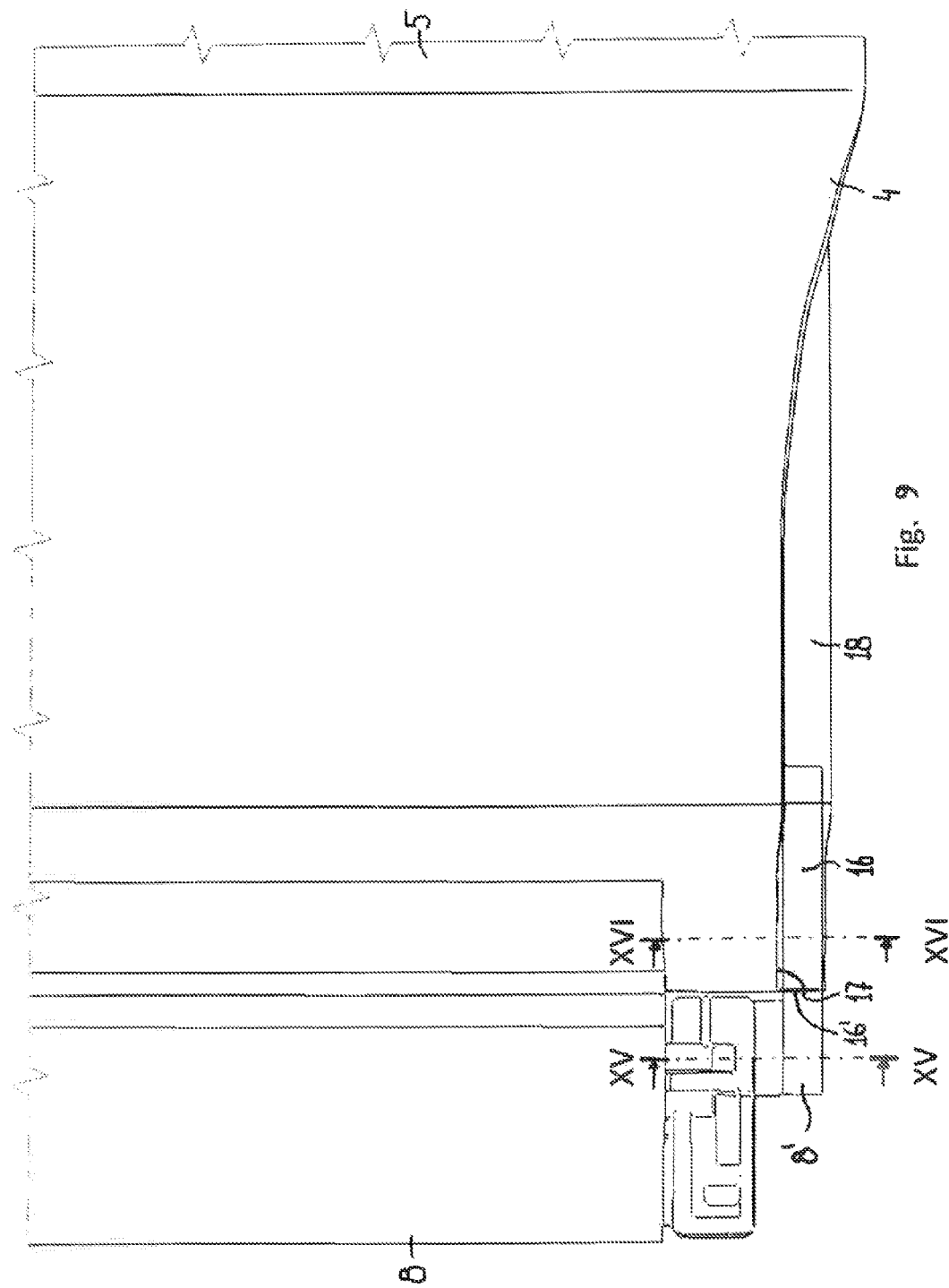
Figure 16:
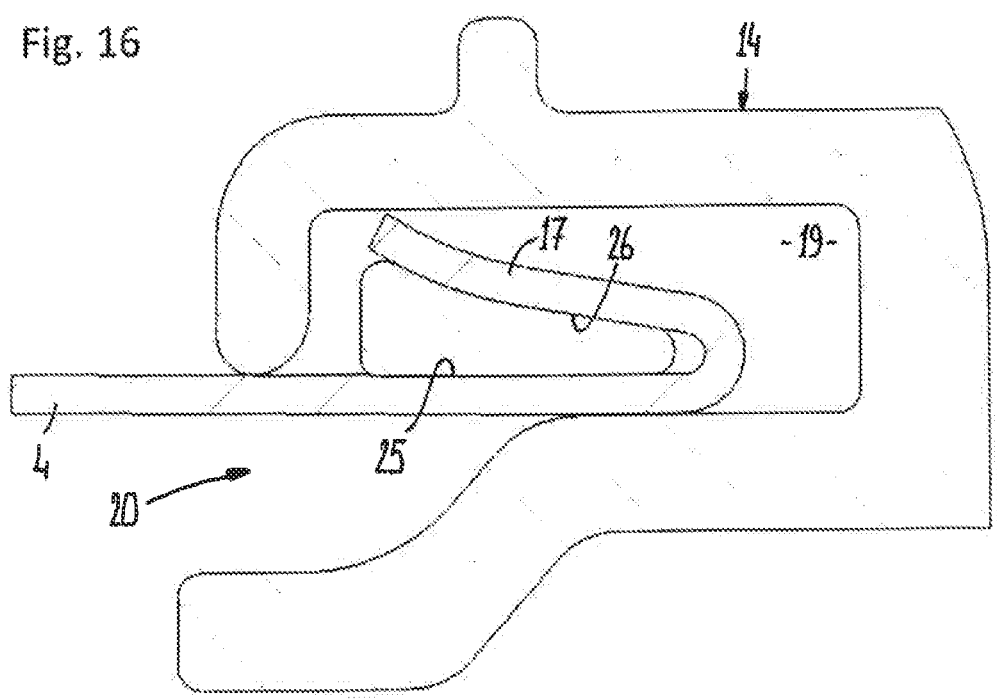

Finally, FIGS. 8 and 9 (in combination with the cross sectional views according to FIGS. 15 and 16) show an embodiment of the positioning member 16 defining a cross sectional shape in correspondence with the intended shape defined by the assembly of inwardly folded part 18 of the sunscreen 4 and remainder of the sunscreen 4 at a position of cooperation with the respective longitudinal guide 14. Specifically, see FIG. 16, the positioning member 16 is wedge shaped with a lower surface 25 extending substantially horizontally and an upper surface 26 extending inclined upwardly as considered in an inward direction towards the entrance opening 20. As a result the inwardly folded wing 17 already has a shape in accordance with the desired shape of the inwardly folded part 18 at a location between the positioning member 16 and the winding shaft 5 for effectively cooperating with the guide 14.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. A sunshade assembly comprising:
   a flexible sunscreen having opposed longitudinal edges and opposed first and second transversal edges;
   a rotatable winding shaft configured to wind and unwind the sunscreen at the first transversal edge thereof;
   an operating beam connected to the second, leading one of said transversal edges; and
   two opposed longitudinal guides each defining a guide channel configured to receive and guide therein inwardly folded parts of corresponding ones of said longitudinal edges of the sunscreen, wherein the guides further each define an inwardly directed, longitudinally extending entrance opening for the respective guide channel and wherein the operating beam at opposite ends is provided with positioning members around which inwardly folded wings of the longitudinal edges of the sunscreen are positioned which define leading parts of the respective inwardly folded parts of the sunscreen, which positioning members extend from the operating beam into corresponding ones of said longitudinal guides and are movable with the operating beam for again positioning the longitudinal edges of the sunscreen into the longitudinal guides after coming out of said guides, wherein each positioning member extends from the operating beam longitudinally in a direction towards the winding shaft such that the positioning member only at a leading end thereof facing away from the winding shaft is connected to the operating beam and is positioned entirely within the respective guide channel without extending through the entrance opening.

2. The sunshade assembly according to claim 1, wherein the positioning member is provided with a recess and wherein the inwardly folded wing of the sunscreen is connected to a remainder of the sunscreen at said recess.

3. The sunshade assembly according to claim 2, wherein the recess is defined by a transversal constriction of the positioning member.

4. The sunshade assembly according to claim 2, wherein the recess is defined by a through hole in the positioning member.

5. The sunshade assembly according to claim 2, wherein the inwardly folded wing of the sunscreen is connected to the remainder of the sunscreen by a mechanical connection selected from the group consisting of a stitch, a staple, a rivet, a weld, an adhesive, or any combination thereof.

6. The sunshade assembly according to claim 1, wherein the positioning member is removably attached to the operating beam.

7. The sunshade assembly according to claim 6, wherein the positioning member is removably attached to the operating beam by a snap connection.

8. The sunshade assembly according to claim 1, wherein the positioning member defines a cross sectional shape in correspondence with an intended shape defined by assembly of an inwardly folded part of the sunscreen and a remainder of the sunscreen at a position of cooperation of said assembly with the respective longitudinal guide.

9. The sunshade assembly according to claim 8, wherein the positioning member is wedge shaped with a lower surface extending substantially horizontally and an upper surface extending inclined upwardly as considered in an inward direction towards the entrance opening.

10. The sunshade assembly according to claim 2, wherein the inwardly folded wing of the sunscreen is connected to the remainder of the sunscreen by means of a mechanical connection comprising a stitch.

11. The sunshade assembly according to claim 2, wherein the inwardly folded wing of the sunscreen is connected to the remainder of the sunscreen by a mechanical connection comprising a staple.

12. The sunshade assembly according to claim 2, wherein the inwardly folded wing of the sunscreen is connected to the remainder of the sunscreen by a mechanical connection comprising a rivet.

13. The sunshade assembly according to claim 2, wherein the inwardly folded wing of the sunscreen is connected to the remainder of the sunscreen by a mechanical connection comprising a weld.

14. The sunshade assembly according to claim 2, wherein the inwardly folded wing of the sunscreen is connected to the remainder of the sunscreen by a mechanical connection comprising an adhesive.

15. The sunshade assembly according to claim 1, wherein opposite outer ends of the operating beam are received in the guide channels of the respective longitudinal guides, and wherein the outer ends of the operating beam have an offset curvilinear shape in cross-section to facilitate passing through the entrance openings that are inwardly directed and longitudinally extending.

16. The sunshade assembly according to claim 15, wherein the positioning members are each substantially planar.

17. A sunshade assembly comprising:
a flexible sunscreen having opposed longitudinal edges and opposed first and second transversal edges, the flexible sunscreen having an inwardly folded part at each longitudinal edge, and wherein the second transversal edge defines a leading edge;
a rotatable winding shaft configured to wind and unwind the sunscreen at the first transversal edge;
two opposed longitudinal guides each defining a guide channel, wherein the guides each further define an inwardly directed, longitudinally extending entrance opening for the respective guide channel;
an operating beam connected to the second transversal edge, wherein opposite outer ends of the operating beam are received in the guide channels of the respective longitudinal guides and extend through the respective entrance openings; and
positioning members provided at opposite ends of the operating beam around which wings of the inwardly folded parts of the flexible sunscreen are positioned, each of the positioning members having a leading part at the respective wings of the inwardly folded parts of the flexible sunscreen, wherein each positioning member extends from the operating beam longitudinally in a direction towards the winding shaft such that the positioning member is connected to the operating beam only at a leading end thereof facing away from the winding shaft, wherein each positioning member has a transverse dimension that is less than a transverse dimension of the guide channel of the respective longitudinal guide such that each positioning member is positionable entirely within the respective guide channel without extending through the entrance opening of the respective longitudinal guide, and wherein the positioning members extend from the operating beam into corresponding ones of the longitudinal guides and are movable with the operating beam to position the longitudinal edges of the flexible sunscreen into the longitudinal guides after coming out of the guides.

18. The sunshade assembly according to claim 17, wherein the outer ends of the operating beam have an offset curvilinear shape in cross-section to facilitate passing through the entrance openings that are inwardly directed and longitudinally extending.

19. The sunshade assembly according to claim 18, wherein the positioning members are each substantially planar.

20. The sunshade assembly according to claim 17, wherein the positioning member is provided with a recess and wherein the inwardly folded wing of the flexible sunscreen is connected to a remainder of the flexible sunscreen at the recess.

* * * * *